United States Patent
Gong et al.

(10) Patent No.: US 9,595,879 B2
(45) Date of Patent: Mar. 14, 2017

(54) CONTROL DEVICE OF SYNCHRONOUS RECTIFIER AND POWER SUPPLY

(71) Applicant: SOLUM CO., LTD., Suwon-si (KR)

(72) Inventors: Jung Chul Gong, Seoul (KR); Hwan Cho, Goyang-Si (KR); Ho Joon Jang, Seoul (KR)

(73) Assignee: Solum Co., Ltd., Suwon-si (KR)

( * ) Notice: Subject to any disclaimer, the term of this patent is extended or adjusted under 35 U.S.C. 154(b) by 0 days.

(21) Appl. No.: 14/713,482

(22) Filed: May 15, 2015

(65) Prior Publication Data

US 2015/0333641 A1    Nov. 19, 2015

(30) Foreign Application Priority Data

May 16, 2014  (KR) .................. 10-2014-0059269
Nov. 28, 2014  (KR) .................. 10-2014-0168789

(51) Int. Cl.
| | | |
|---|---|---|
| *H02M 3/335* | (2006.01) | |
| *H02M 1/32* | (2007.01) | |
| *H02M 5/458* | (2006.01) | |
| *H02M 1/34* | (2007.01) | |

(52) U.S. Cl.
CPC ......... *H02M 3/33592* (2013.01); *H02M 1/32* (2013.01); *H02M 3/33523* (2013.01); *H02M 5/4585* (2013.01); *H02M 2001/348* (2013.01)

(58) Field of Classification Search
CPC .................................................. H02M 3/335
See application file for complete search history.

(56) References Cited

U.S. PATENT DOCUMENTS

| | | | | |
|---|---|---|---|---|
| 7,889,521 | B2 * | 2/2011 | Hsu ................ | H02M 3/33592 363/21.14 |
| 7,936,575 | B2 * | 5/2011 | Hu ................. | H02M 3/33592 363/21.06 |
| 2005/0152158 | A1 | 7/2005 | Gut et al. | |
| 2006/0013022 | A1 * | 1/2006 | Jitaru .............. | H02M 1/38 363/21.12 |
| 2009/0086512 | A1 | 4/2009 | Fahlenkamp et al. | |
| 2010/0027298 | A1 * | 2/2010 | Cohen ............. | H02M 3/33592 363/21.14 |
| 2010/0182806 | A1 * | 7/2010 | Garrity ........... | H02M 3/33569 363/21.14 |
| 2012/0300520 | A1 | 11/2012 | Ren et al. | |
| 2013/0229832 | A1 * | 9/2013 | Patel .............. | H02M 3/33507 363/21.12 |

(Continued)

FOREIGN PATENT DOCUMENTS

WO    WO 2004/015850 A1    2/2004

OTHER PUBLICATIONS

Extended European Search Report issued Oct. 5, 2015 in counterpart European Application No. 15167815.8 (8 pages in English).

*Primary Examiner* — Emily P Pham
(74) *Attorney, Agent, or Firm* — NSIP Law

(57) ABSTRACT

A power supply has a primary side and a secondary side electrically insulated from each other. A switching operation based on a switching of the primary side is controlled according to the power transmitted to the secondary side, and the switching operation is converted at a time earlier than a switching conversion time of the primary side by a predetermined time.

36 Claims, 6 Drawing Sheets

(56) References Cited

U.S. PATENT DOCUMENTS

2014/0003097 A1\* 1/2014 Sakurai ............ H02M 3/33507
  363/21.14
2014/0112027 A1 4/2014 Tseng et al.
2014/0119063 A1 5/2014 Tseng et al.

\* cited by examiner

CONTROL DEVICE OF SYNCHRONOUS RECTIFIER AND POWER SUPPLY

CROSS-REFERENCE TO RELATED APPLICATIONS

This application claims the benefit under 35 U.S.C. 119(a) of Korean Patent Application Serial Nos. 10-2014-0059269 and 10-2014-0168789, filed on May 16, 2014 and Nov. 28, 2014 respectively, which are hereby incorporated by reference in their entirety for all purposes.

BACKGROUND

1. Field

The present invention relates to a control device of a synchronous rectifier and a power supply.

2. Description of Related Art

In recent years, various types of electronic devices such as a computer, a display device, various control devices or the like have been used to be matched with various requirements of the user at various spaces such as a house, an office, an industrial plant or the like.

In order to perform various operations to suitably address various requirements of the user, such electronic devices necessarily employ a power supply to supply the driving power required for operation thereof. The power supply may be employed within the electronic devices themselves, or may be established external thereto.

The power supply may employ a switching mode power supply (SMPS) method due to the advantages of the conventional power conversion efficiency and miniaturization benefits, amongst others.

The above-described SMPS type power supply can switch the power inputted to the primary side; transmit the switched power to the secondary side through a transformer; and output the direct current appropriate for use by rectifying the power transmitted from the secondary side.

On the other hand, in the case of the above-described power supply, the synchronous rectification type power supply can be employed to minimize the conduction loss by using the switching type synchronous rectifier SR synchronized with the primary side switching at the secondary side rectification terminal.

In case of such power supply of the synchronous rectifier variety, although the synchronous rectifier is switched on by being synchronized with the primary side switching off and the synchronous rectifier is switched off by being synchronized with the primary side switching on, in alternating relation, but, according to delaying the switching of the synchronous rectifier, an overlap phenomenon may be generated while the synchronous rectifier is switched on during the primary switching on, in this result, the output power becomes unstable and may destroy the insulation of the synchronous rectifier or the other devices.

In order to prevent such overlap phenomenon, although the dead time control technology or the like can be used, due to various reasons (for example, the switching frequency variation at the primary side), the dead time (the time interval between the off time of the synchronous rectifier and the switching on time at the primary side) may be varied; and, accordingly, it cannot be fixed and controlled with the optimum dead time in stabilizing the power system and the efficiency thereof.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a control device of a synchronous rectifier includes a control device formed at a secondary side of a power supply, the power supply is provided with a primary side and the secondary side which are electrically insulated from each other. The control device is configured to control a rectified switching operation based on a switching of the primary side according to the power transmitted to the secondary side, and the rectified switching operation is converted at a time earlier than a switching conversion time of the primary side by a predetermined time.

The rectified switching operation may be converted from a switching on to a switching off at a time earlier than a time of conversion from a switching off of the primary side to a switching on by the predetermined time.

The control device of the synchronous rectifier may include a clock generation unit configured to generate a clock signal according to a switching conversion time of the primary side and the predetermined time; an off time determination unit configured to determine a switching off time of a rectified switching operation according to the clock signal from the clock generation unit; and a driving unit configured to output a driving signal to drive the rectified switching operation according to the switching off time of the off time determination unit.

The clock generation unit may include a first clock generation unit configured to generate a first clock signal according to a time when a switching off of the primary side is converted into a switching on by detecting a voltage level of a power transmitted to the secondary side; and a second clock generation unit configured to generate a second clock signal by delaying a high period of the first clock signal by the predetermined time.

The first clock generation unit may include a detection unit configured to detect a voltage level of a power transmitted to the secondary side; and a first clock signal generation unit configured to generate the first clock signal at a time when a switching off of the primary side is converted into a switching on based on a detection result from the detection unit and output the generated first clock signal to the off time determination unit.

The second clock generation unit may include a time delay unit configured to delay a high period of the first clock signal by a predetermined time; and a second clock signal generation unit configured to generate the second clock signal based on a signal output from the time delay unit and output the generated second clock signal to the off time determination unit.

The off time determination unit may include a voltage-current converting unit configured to convert a preset reference voltage into a current; a first ramp wave signal generation unit configured to generate a first ramp wave signal by charging and discharging the current from the voltage-current converting unit according to the first clock signal; a second ramp wave signal generation unit configured to generate a second ramp wave signal by charging and discharging the current from the voltage-current converting unit according to the second clock signal; a voltage-voltage converting unit configured to convert a voltage level of the second ramp wave signal from the second ramp wave signal generation unit; a hold voltage generation unit configured to generate a hold voltage based on the second ramp wave signal of which the voltage level is converted by the voltage-voltage converting unit; and a comparison unit configured to determine a switching off time by comparing the hold voltage from the hold voltage generation unit with the voltage level of the first ramp wave signal.

The first ramp wave signal generation unit may include a first current mirror configured to mirror a current from the voltage-current converting unit; and a first charging and discharging unit configured to generate the first ramp wave signal by charging and discharging the current mirrored by the first current mirror to/from a first capacitor according to the first clock signal.

The second ramp wave signal generation unit may include a second current mirror configured to mirror a current from the voltage-current converting unit; and a second charging and discharging unit configured to generate the second ramp wave signal by charging and discharging the current mirrored by the second current mirror to/from a second capacitor according to the second clock signal.

The second capacitor may be completely discharged with the same period as the first capacitor.

In another general aspect, a control device of a synchronous rectifier includes a control device formed at a secondary side of a power supply, the power supply provided with a primary side and the secondary side electrically insulated from each other, the control device configured to control a rectified switching operation by detecting a switching conversion time of the primary side, the rectified switching operation being converted before the detected switching conversion time of the primary side by a predetermined time, and a conversion time of the rectified switching operation being determined based on a dual signal waveform.

In another general aspect, a power supply is provided with a primary side and a secondary side electrically insulated from each other and includes a power supply unit configured to switch a power input to the primary side to transmit to the secondary side; and a synchronous rectifying unit formed at the secondary side configured to perform a rectification switching operation based on the switching of the power supply unit according to the power transmitted to the secondary side and convert the rectification switching operation at a time earlier than a switching conversion time of the power supply unit by a predetermined time.

In another general aspect, a power supply provided with a primary side and a secondary side electrically insulated from each other, includes a power supply unit configured to switch a power input to the primary side to transmit to the secondary side; and a synchronous rectifying unit formed at the secondary side configured to perform a rectification switching operation by detecting a switching conversion time of the power supply unit, to convert the rectification switching operation at a time earlier than the detected switching conversion time of the power supply unit by a predetermined time and determine a conversion time of the rectification switching operation based on a dual signal waveform.

In another general aspect, a method for reducing actuation overlap between a primary side and a secondary side of a transformer in a power supply includes actuating a first switch to control a primary side of a transformer in a power supply; detecting, on a secondary side of the transformer, an indicia of a change in operating state of the primary side of the transformer; adaptively establishing a delay parameter according to the switching of the primary side; selectively actuating a second switch on the secondary side of the transformer responsive to the indicia and the delay parameter.

A non-transitory computer-readable storage medium may be provided for storing instructions for causing a processor to perform such a method.

The control device may be configured to control the rectified switching operation to be synchronized with the switching of the primary side in an alternating manner.

Other features and aspects will be apparent from the following detailed description, the drawings, and the claims.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The technical configurations as well as the operational effects for control device of the synchronous rectifier and the power supply in accordance with the exemplary embodiments will be clearly understood by the following detailed description with reference to the accompanying drawings.

The descriptions of well-known components and processing techniques are omitted so as not to unnecessarily obscure the disclosure. As the terms of first, second, third, and the like in the present specification will be used for distinguishing one element from the other elements, the element is not limited by the terms.

Hereinafter, exemplary configurations and illustrative operational effects will be described in detail with reference to the accompanying drawings.

A control device of a synchronous rectifier and a power supply is provided which may be capable of controlling the synchronous rectifier with a fixed dead time.

A control device of a synchronous rectifier and a power supply may be configured to be controlled in such a way that the switching operation of the secondary side synchronous rectifier is converted at an earlier time before the switching conversion time of the primary side by a predetermined amount of time.

A control device of a synchronous rectifier and a power supply may be employed to determine the switching conversion time of the synchronous rectifier by using a dual signal waveform (a signal waveform reflecting on the primary side switching information and a signal waveform reflecting on the fixed dead time).

Figure 1:
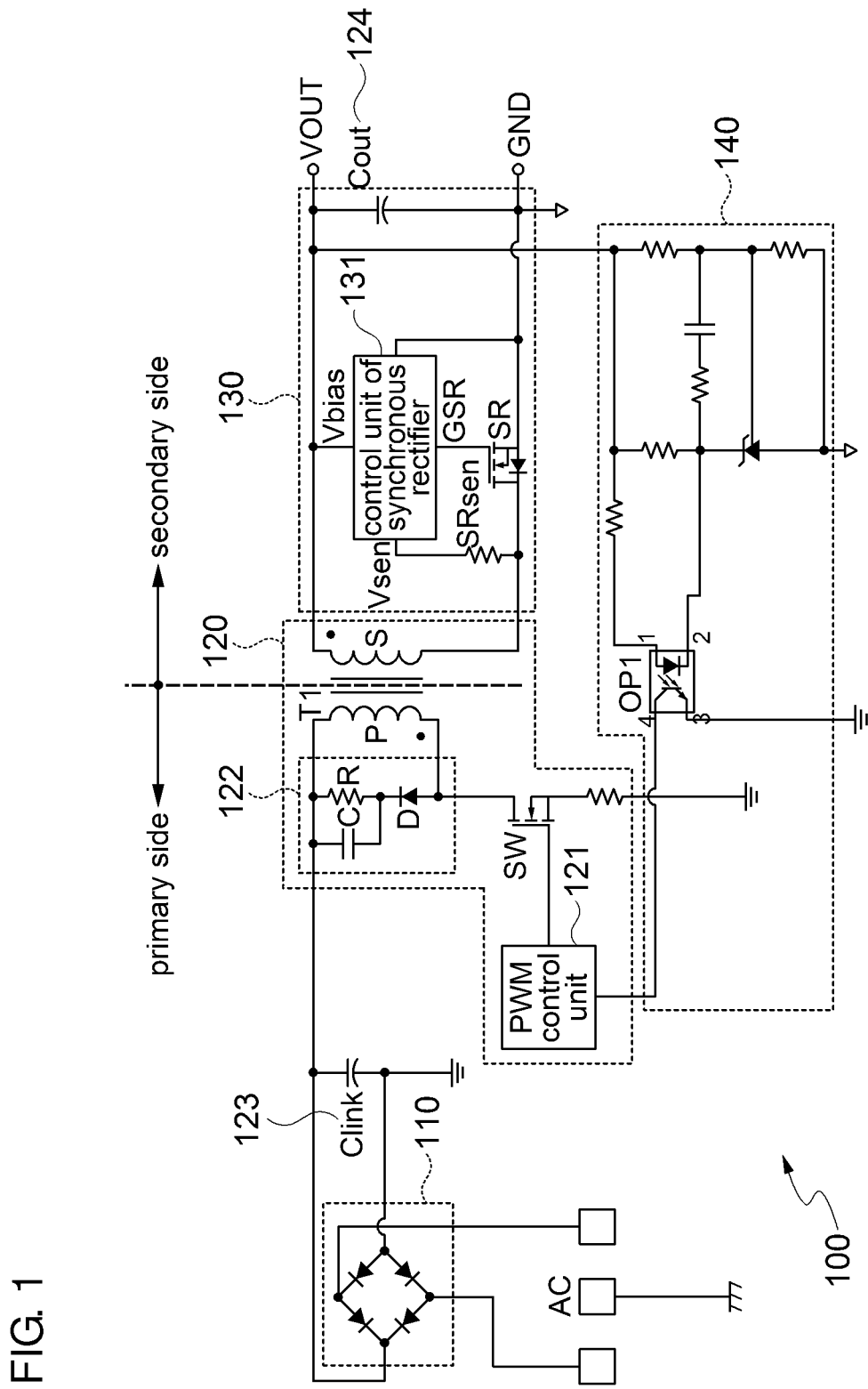
FIG. 1 is a schematic circuit diagram illustrating an exemplary power supply.

FIG. 1 is a schematic circuit diagram of a power supply in accordance with one exemplary embodiment.

The power supply 100 in accordance with the embodiment, as shown in FIG. 1, may include a power supply unit 120 and a synchronous rectifying unit 130, and further can include a primary side and a secondary side electrically isolated from direct contact with each other but inductively or electromagnetically coupled through the transformer T1.

In this case, the power supply 100 in accordance with the exemplary embodiment shown in FIG. 1 includes the power supply unit 120 which may be formed having a primary side and a secondary side, and the synchronous rectifying unit 130 may be formed at the secondary side.

On the other hand, the power supply 100 in accordance with the exemplary embodiment, as shown in FIG. 1, may include a rectifier 110 and a signal feedback unit 140. In this case the rectifier 110 may be formed at the primary side and the signal feedback unit 140 may be formed at the secondary side.

The rectifier 110 rectifies the input alternating current (AC) to transmit it to the power supply unit 120, and a link capacitor (Clink) 123 is provided at a front end of the power supply unit 120 to stabilize the rectified power.

The exemplary power supply unit 120 seen in FIG. 1 switches power input to the primary side for transmission to the secondary side. Power supply unit 120 includes a pulse width modulation (PWM) control unit 121, a Snubber circuit 122, a transformer T1, and a power switch SW.

The PWM control unit 121 controls the switching on/off of the power switch SW according to the feedback information from the signal feedback unit 140.

The Snubber circuit 122 includes, in an exemplary configuration, a capacitor C, a resistor R and a diode D; through such a configuration, the spike voltage generated during the switching can be suppressed by consuming the residual power generated by the switching on/off of the power switch SW.

The transformer T1 includes a primary winding P formed at the primary side which forms a turn ratio (set previously) by magnetic coupling between the primary winding P and a secondary winding S to vary the voltage level of the power input to the primary winding P according to the turn ratio to supply it to the secondary side. In other words, the number of primary windings P relative to the number of secondary windings S establishes a turn ratio which is established in advance according to the input voltage and the desired voltage and/or current on the secondary side of the circuit.

The power switch SW is connected to one end of the primary winding P, and the power is converted by switching on/off the power input to the primary winding P according to the control of the PWM control unit 121.

The synchronous rectifying unit 130 outputs the power VOUT after the power from the secondary winding S is rectified and stabilized through the capacitor Cout 124.

Before output, the synchronous rectifying unit 130 includes a synchronous rectifier control unit 131 configured to control the switching on/off of the synchronous rectifier SR by being synchronized with the switching of the power switch SW.

The synchronous rectifier control unit 131 supplies a driving signal GSR synchronized with the switching of the power switch SW based on the detected voltage Vsen which detects the power transmitted to the secondary side S by the detection resistor SRsen. In this case, the synchronous rectifier control unit 131 may be operated by receiving the bias voltage Vbias.

The synchronous rectifier control unit 131 may control the switching on/off of the synchronous rectifier SR based on the voltage Vsen detected by the detection resistor SRsen, the switching on/off of the power switch SW is predicted in advance; and, accordingly, the synchronous rectification switch SR can be previously driven based on the off time of the synchronous rectifier SR.

In this case, the synchronous rectifier control unit 131, in driving the synchronous rectifier, generates the signal waveform reflecting the fixed dead time together with the signal waveform reflecting the switching information of the primary side, and can determine the switching conversion time (the switching off time) of the synchronous rectifier SR by using the together generated dual signal waveform. Through this, the synchronous rectifier control unit 131 can control the synchronous rectifier SR with the fixed dead time, it will be described hereinafter.

Figure 2:
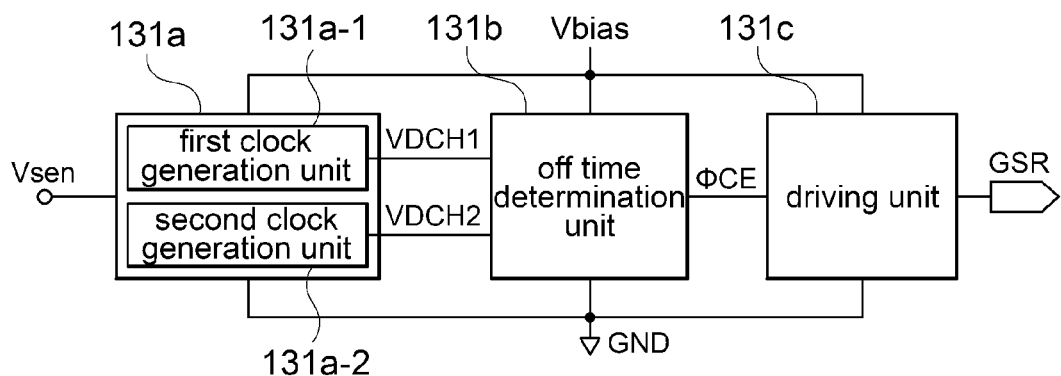
FIG. 2 is a schematic block diagram illustrating an exemplary control device of a synchronous rectifier.

FIG. 2 is a schematic block diagram of an exemplary synchronous rectifier control unit 131. The synchronous rectifier control unit 131, as shown in FIG. 2, may include a clock generation unit 131a, an off time determination unit 131b and a driving unit 131c. The clock generation unit 131a, as shown in FIG. 2, includes a first clock generation unit 131a-1 and a second clock generation unit 131a-2.

Figure 3:
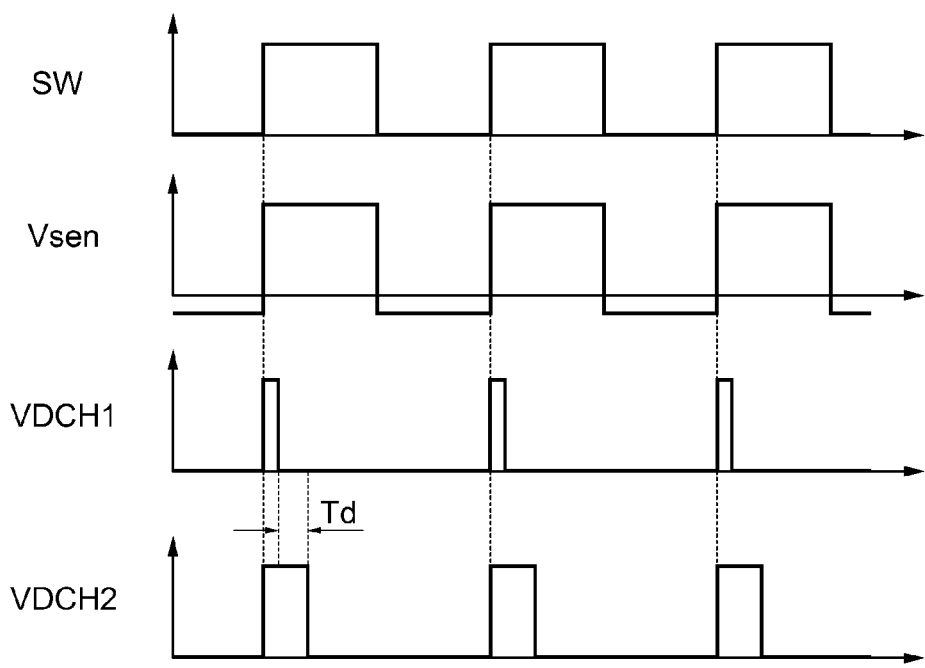
FIG. 3 is a graph showing an exemplary signal waveform for a clock generation unit.

FIG. 3 is a graph showing an exemplary signal waveform for the clock generation unit 131a. Referring to FIG. 1 to FIG. 3, the first clock generation unit 131a-1 is configured to recognize the time when the power switch SW of the power supply unit 120 is converted from the switching off to the switching on by monitoring the detection voltage Vsen to detect the power outputted from the secondary winding S.

Accordingly, the first clock generation unit 131a-1 may generate a first clock signal VDCH1 according to the recognized conversion time, as shown in FIG. 3, and the first clock signal VDCH1 can reflect on the switching information of the primary side. While the second clock generation unit 131a-2, as shown in FIG. 2, may generate a second clock signal VDCH2.

The second clock signal VDCH2, as shown in FIG. 3, may be the clock signal obtained by delaying the high period in the first clock signal VDCH1 by a predetermined time Td. The delay time Td may be established to adaptively compensate for the stabilization of the power system. Td may be established according to the time period of the minimum dead time as may be required for the stabilization of the power system (that is, prevention of the overlap phenomenon), the dead time may be fixed and determined according to the setting of the delay time Td.

On the other hand, the off time determination unit 131b may determine a switching off time φCE of the synchronous rectifier SR according to the first and the second clock signals VDCH1 and VDCH2 from the clock generation unit 131a. The driving unit 131c drives the driving signal GSR to drive the switching operation of the synchronous rectifier SR according to the switching off time φCE outputted from the off time determination unit 131b.

Figure 4:
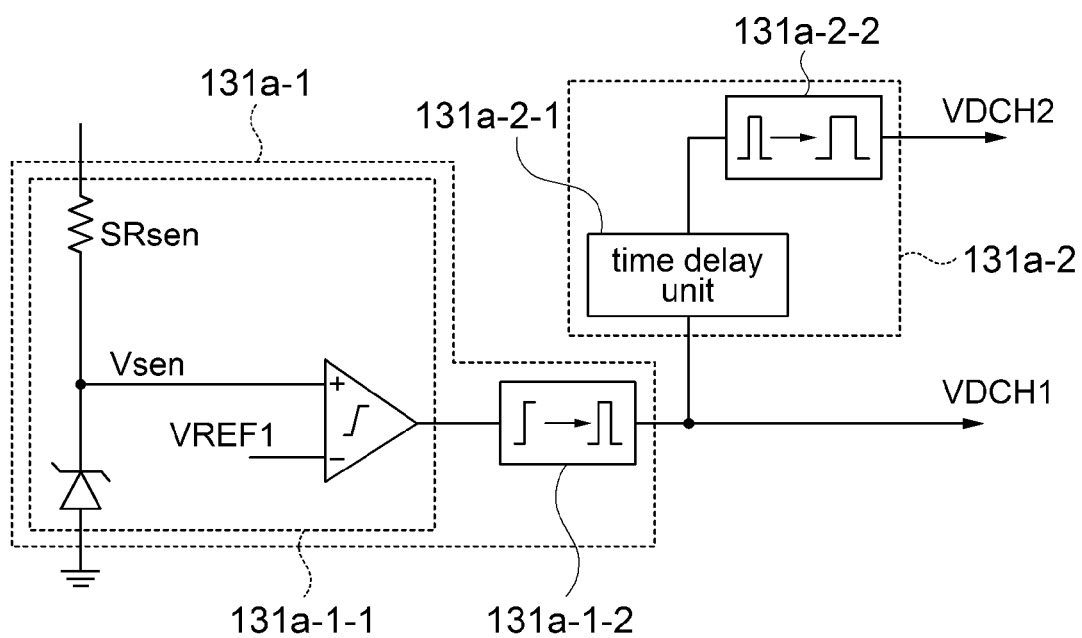
FIG. 4 is a schematic circuit diagram of an exemplary clock generation unit.

FIG. 4 is a schematic circuit diagram of an exemplary clock generation unit. The clock generation unit 131a, as illustrated in FIG. 4, includes the first clock generation unit 131a-1 and the second clock generation unit 131a-2. The first clock generation unit 131a-1, as shown in FIG. 4, includes a detection unit 131a-1-1 and a first clock signal generation unit 131a-1-2.

The detection unit 131a-1-1 detects the voltage level of the power outputted from the secondary winding S. The detection voltage Vsen may have the positive voltage level and the negative voltage level according to the switching of the power switch SW.

The detection unit 131a-1-1, as shown in FIG. 4, for example, may detect the time as a reference voltage VREF1 that the voltage level of the detection voltage Vsen is previously set by employing the comparator. The time as the reference voltage VREF1 means the time that the switching of the power switch SW is converted from the on to the off, that is, may be the switching conversion time of the power switch SW.

Merely as an example, 4V may serve as the level of the reference voltage VREF1, however it is not limited thereto. Any suitable voltage level may be employed as the reference voltage VREF1 which does not generate excessive ground noise.

On the other hand, the first clock signal generation unit 131a-1-2, as shown in FIG. 4, generates the first clock signal VDCH1 based on the signal output from the detection unit 131a-1-1. The first clock signal generation unit 131a-1-2, as shown in FIG. 3 and FIG. 4, generates the first clock signal VDCH1 at the rising edge time when the switching off of the power switch SW is converted into the switching on, and the first clock signal VDCH1 may be supplied to the off time determination unit 131b.

Thereafter, the second clock signal generation unit 131a-2, as shown in FIG. 4, includes a time delay unit 131a-2-1 and a second clock signal generation unit 131a-2-2.

The time delay unit 131a-2-1, as shown in FIG. 3 and FIG. 4, can delay the falling of the high period in the first clock signal VDCH1 outputted from the first clock signal generation unit 131a-1-2 by a predetermined time Td to thereby generate VDCH2. The delay time Td, as described above, may be set as the same time length of the minimum dead time required for the stabilization of the power system; and, finally, the dead time may be fixed and determined according to the setting of the delay time Td.

On the other hand, the second clock signal generation unit 131a-2, as shown in FIG. 4, may generate the second clock signal VDCH2 obtained by delaying the high period in the first clock signal VDCH1 by the dead time (that is, the delay time Td) through the time delay unit 131a-2-1, and also may supply the generated second clock signal VDCH2 to the off time determination unit 131b.

Figure 5:
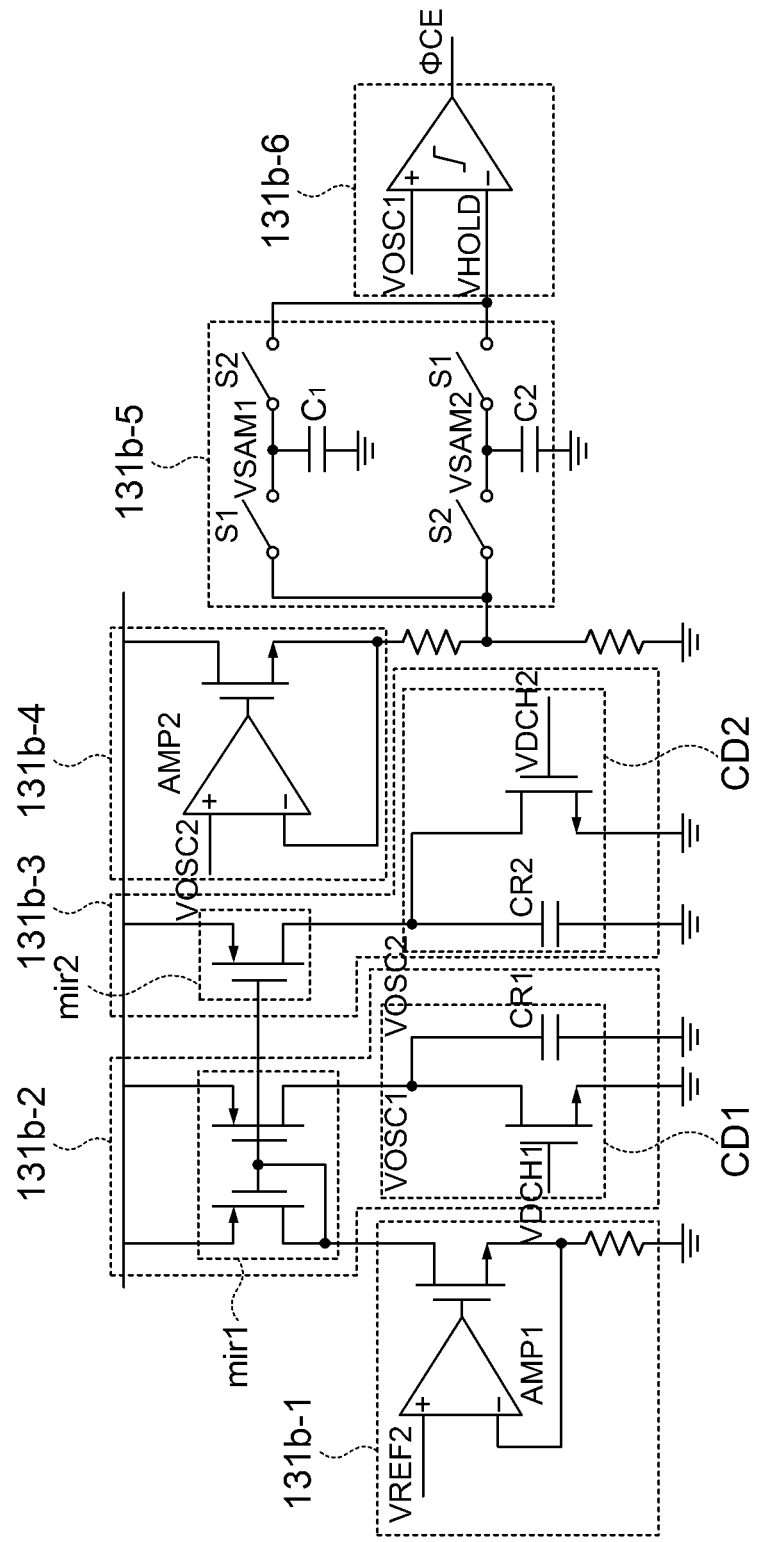
FIG. 5 is a schematic circuit diagram of an exemplary off time determination unit.
Figure 6:
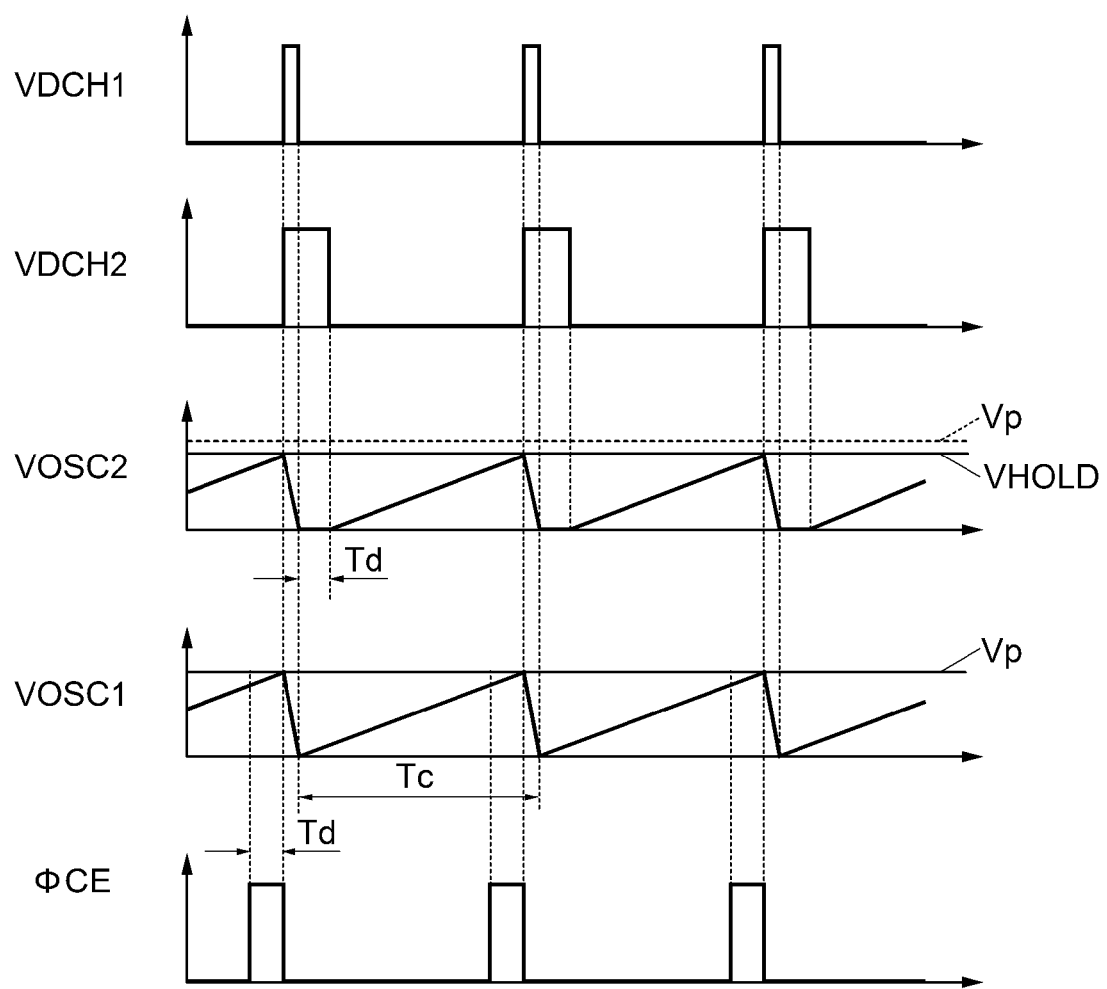
FIG. 6 is a graph showing the signal waveforms of major parts of an example of a control device of the synchronous rectifier.

FIG. 5 is a schematic circuit diagram of an exemplary off time determination unit 131b and FIG. 6 is a graph showing sample signal waveforms of major parts of the control device 131 of the synchronous rectifier.

The off time determination unit 131b, as shown in FIG. 5, includes a voltage-current converting unit 131b-1, a first ramp wave signal generation unit 131b-2, a second ramp wave signal generation unit 131b-3, a voltage-voltage converting unit 131b-4, a hold voltage generation unit 131b-5 and a comparison unit 131b-6.

Initially, the voltage-current converting unit 131b-1 converts the previously set reference voltage VREF2 into a current signal. Thereafter, the first ramp wave signal generation unit 131b-2, as shown in FIG. 5 and FIG. 6, may generate a first ramp wave signal VOSC1 by charging and discharging the current from the voltage-current converting unit 131b-1 according to the first clock signal VDCH1. In order to do this, the first ramp wave signal generation unit 131b-2, as shown in FIG. 5, may include a first current mirror mir1 and a first charging and discharging unit CD1. The first current mirror mir1 mirrors the current from the voltage-current converting unit 131b-1. And also, the first charging and discharging unit CD1 may charge and discharge the current mirrored by the first current mirror mir1 to the first capacitor CR1 by switching in response to the first clock signal VDCH1 reflecting on the primary side switching information.

Accordingly, the first ramp wave signal VOSC1 output from the first ramp wave signal generation unit 131b-2 may be the ramp waveform to reflect on, e.g., the information such as the primary side frequency or the period. Thereafter, the second ramp wave signal generation unit 131b-3 generates the second ramp wave signal VOSC2 by charging and discharging the current from the voltage-current converting unit 131b-1 according to the second clock signal VDCH2. The second ramp wave signal generation unit 131b-3 includes a second current mirror mir2 and a second charging and discharging unit CD2. The second current mirror mir2 mirrors the current from the voltage-current converting unit 131b-1. And also, the second charging and discharging unit CD2 charges and discharges the current mirrored by the second current mirror mir2 at the second capacitor CR2 by switching in response to the second clock signal VDCH2 reflecting on the delay time Td (that is, the fixed dead time), and can generate the second ramp wave signal VOSC2 based on this.

In this exemplary case, referring to FIG. 6, the second capacitor CR2 may be completely discharged at the same period Tc of the first capacitor CR1 of the first ramp wave signal generation unit 131b-2; and, accordingly, the second ramp wave signal VOSC2 generates the ramp wave delayed from the first ramp wave signal VOSC1 by the delay time Td.

Accordingly, the peak voltage of the second ramp wave signal VOSC2, as shown in FIG. 6, is relatively lower than VOSC1 proportional to the delay time Td (that is, the fixed dead time) rather than the peak voltage Vp of the first ramp wave signal VOSC1. The voltage-voltage converting unit 131b-4 converts the voltage level of the second ramp wave signal VOSC2 from the second ramp wave signal generation unit 131b-3. Thereafter, the hold voltage generation unit 131b-5 generates the hold voltage VHOLD based on the ramp wave signal VOSC2 such that the voltage level is converted by the voltage-voltage converting unit 131b-4.

The hold voltage generation unit 131b-5 charges the voltages of the ramp wave signals VSAM1 and VSAM2 having the converted voltage levels to the capacitors C1 and C2 by the plurality of switches S1 and S2 to turn on/off according to the switching control signal.

The switching control signal may be generated according to the second clock signal VDCH2 reflecting on the fixed dead time (that is, the delay time Td), and may generate the switching control signal to control the switching of each of the switches S1 and S2 by dividing the second clock signal VDCH2 in half and setting the phase inversely. Also, the hold voltage generation unit 131b-5 may set the voltages of the ramp wave signals VSAM1 and VSAM2 having the converted voltage levels as the hold voltage VHOLD and output these to the comparison unit 131b-6.

Then, the comparison unit 131b-6 when the voltage levels of the hold voltage VHOLD and the first ramp wave signal VOSC1 are compared with each other, for example, in case when the voltage levels of the hold voltage VHOLD generated from the second ramp wave signal VOSC2 having the peak voltage lower than the that of the first ramp wave signal VOSC1 and the first ramp wave signal VOSC1 are compared with each other, as shown in FIG. 6, the switching operation of the power switch SW may be determined as the delay time Td previously set earlier than the time (the rising edge time of the first clock signal VDCH1) when the switching operation of the power switch SW is converted from the switching off to the switching on, that is, the time in advance by the fixed dead time may be determined as the switching off time (the rising edge time on the ɸCE of FIG. 6) of the synchronous rectifier.

Finally, the driving unit 131c of the synchronous rectifier control unit 130 may responsively control the switching of the synchronous rectifier SR with the fixed dead time by generating the driving signal GSR based on the switching off time ɸCE of the synchronous rectifier.

The synchronous rectifier control unit 131 having the configuration as described above may generate the dual signal waveform to generate the signal waveform reflecting on the fixed dead time together with the signal waveform reflecting on the primary side switching information, and determines the switching conversion time (the switching off time) of the synchronous rectifier SW by using such dual signal waveform.

Figure 7:
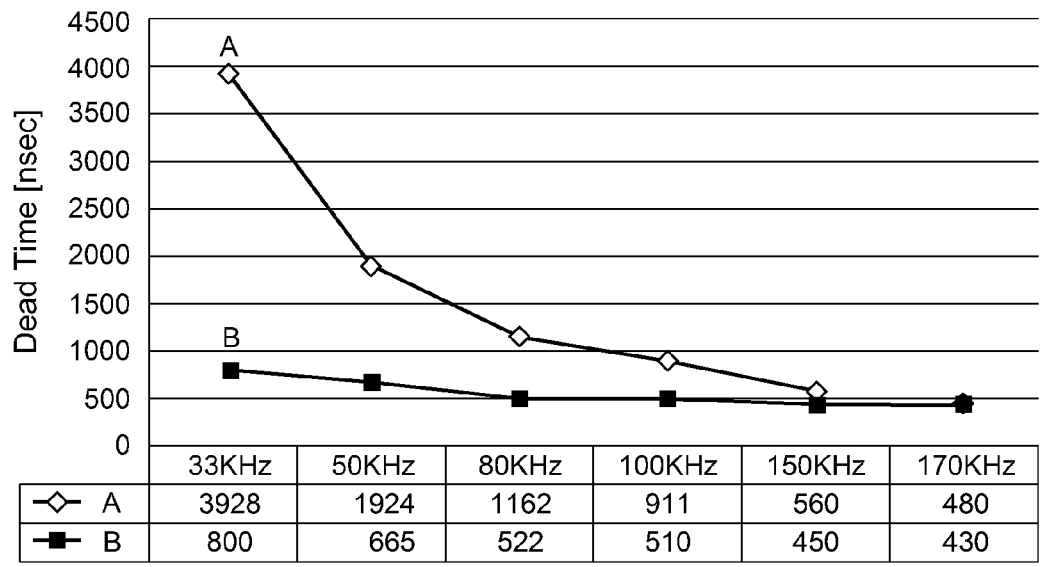
FIG. 7 is a graph comparing a dead time of an illustrative power supply with a dead time of a conventional power supply; and, FIG. 8 is a flow chart illustrating an exemplary flow of processes.

Accordingly, since the exemplary synchronous rectifier control unit 131 may control the synchronous rectifier SR with the fixed dead time, as seen, for example, in FIG. 7 which is a graph comparing a dead time of an exemplary power supply in accordance with the present disclosure with a dead time of a conventional power supply.

That is, in contrast to the conventional power supply A, referring to FIG. 7, it can be clearly confirmed that the dead time of power supply B is almost uniformly fixed and maintained with a substantial reduction relative to power supply A although the primary side switching frequency or the like is changed.

Accordingly, since the minimum dead time required for the stabilization of the power system can be fixed and set, the efficiency of power conversion is prevented from being deteriorated due to the unnecessarily long dead time.

Inasmuch as the exemplary control device 130 of the synchronous rectifier having the above-described configuration is configurable to fix and set the dead time required for the stabilization of the power system, before the power switch SW is switched on, in the case when the power conversion operation is performed at the continuous conduction mode by switching off the synchronous rectifier SR, the overlap phenomenon, i.e., the status that the power switch SW and the synchronous rectifier SR are switched on at the same time, may be prevented.

In addition, in the discontinuous conduction mode, the erroneous operation may be prevented by switching off the synchronous rectifier SR by selecting the signal of the earlier time among the time detecting the negative voltage in the detection resistor SRsen or the determined switching off time.

Figure 8:
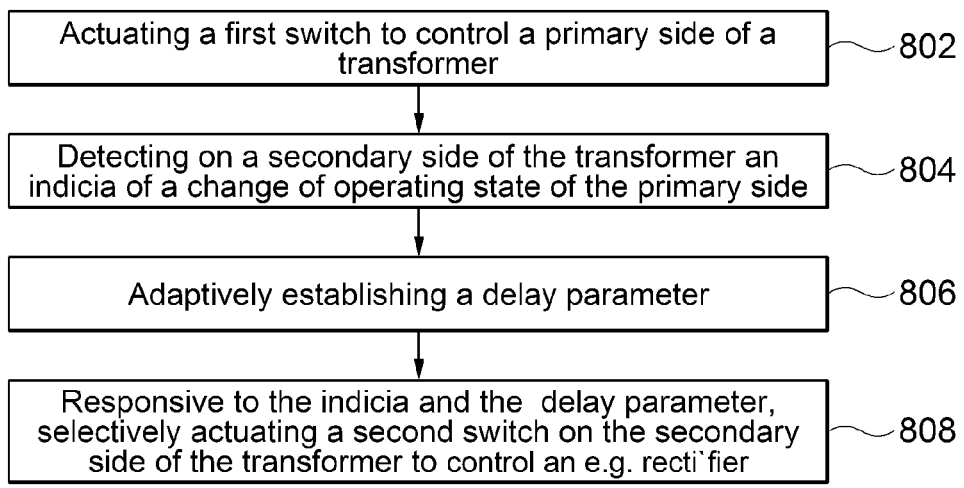

FIG. 8 is a flow chart illustrating an exemplary flow of processes for controlling a transformer. At block 802a first switch on a primary side of a transformer is actuated. At block 804, an indicia of a change of operating state of the primary side is detected on the secondary side, such as described above by employing a sensor, meter, resistor, voltmeter, ammeter, or the like to determine a change in voltage, current, inductance, impedance, or the like such as may tend to indicate that the primary side has been engaged or disengaged.

A delay parameter is adaptively established at block 806. The delay parameter may be established as discussed above, such as, for example, by monitoring a periodicity of change in operating state, a time for the settling of system state to reach a predetermined threshold of activity/inactivity, or the like. The delay parameter may be established heuristically considering a circuit layout, schematic, particularities of the hardware components of the primary side, or the like. The delay parameter may be adaptively established according to, for example, the discharge of capacitors, inductors, or the like to provide sufficient time for the primary side to be suitably deactivated and dis-energized.

Responsive to the indicia and the established delay parameter, at block 808, a second switch on the secondary side of the transformer may be selectively actuated to control a rectifier such as, for example, a switching rectifier (as described more fully above), and/or other load, or supply conditioning measures such as inductors, capacitors, regulators, filters, and the like.

Accordingly, some illustrative advantageous effects may include the output power being stabilized and the insulation collapse of the device being prevented. Furthermore, inasmuch as the secondary side synchronous rectifier can be switched off in advance by predicting the primary side switching on time, the output power may be stabilized without the additional circuit even in the discontinuous conduction mode (DCM) or the continuous conduction mode (CCM).

The functions of the various elements shown in the drawings may be provided through the use of dedicated hardware as well as hardware capable of executing software in association with appropriate software. When provided by a processor, the functions may be provided by a single dedicated processor, by a single shared processor, or by a plurality of individual processors, some of which may be shared (as discussed in more detail below).

Moreover, explicit use of the term "controller" should not be construed to refer exclusively to hardware capable of executing software, and may implicitly include, without limitation, an application specific integrated circuit (ASIC) with suitable discrete logic gates such as AND, OR, NOR, XOR, and the like, a programmable logic array (PLA), field programmable gate array (FPGA), one or more microprocessors (MCU), system on chip (SOC), digital signal processor (DSP) hardware, read-only memory (ROM) for storing software, random access memory (RAM), non-volatile storage, and the like.

Reference in the specification to "connect" or "connecting", as well as other variations thereof, means that an element is directly connected to the other element or indirectly connected to the other element through another element.

Throughout this specification, the singular form includes the plural form unless the context clearly indicates otherwise. The terms "comprises" and/or "comprising" used herein does not preclude existence and addition of another component, step, operation and/or device, in addition to the above-mentioned component, step, operation and/or device.

The apparatuses, units, modules, controllers, devices, and other components illustrated in FIGS. 1-2 and 4-5 that perform the operations described herein may be implemented by hardware components. Examples of hardware components include controllers, sensors, generators, drivers, filters, rectifiers, comparators, switches, diodes, transistors, resistors, capacitors, transformers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the circuit schematics illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A control device of a synchronous rectifier comprising:
   a controller formed at a secondary side of a power supply, the power supply provided with a primary side and the secondary side electrically insulated from each other, the controller configured to control a rectified switching operation based on a switching of the primary side according to a power transmitted to the secondary side, and the rectified switching operation is converted at a time earlier than a switching conversion time of the primary side by a predetermined time,
   wherein the controller of the synchronous rectifier comprises:
   a clock generation unit configured to generate a clock signal according to the switching conversion time of the primary side and the predetermined time;
   an off time determination unit configured to determine a switching off time of the rectified switching operation according to the clock signal from the clock generation unit; and a driver configured to output a driving signal to drive the rectified switching operation according to the switching off time of the off time determination unit.

2. The control device of the synchronous rectifier according to claim 1, wherein the rectified switching operation is converted from a switching on to a switching off at a time earlier than a time of conversion from a switching off of the primary side to a switching on of the primary side by the predetermined time.

3. The control device of the synchronous rectifier according to claim 1, wherein the clock generation unit comprises:
a first clock generator configured to generate a first clock signal according to a time when a switching off of the primary side is converted into a switching on of the primary side by detecting a voltage level of the power transmitted to the secondary side; and
a second clock generator configured to generate a second clock signal by delaying a high period of the first clock signal by the predetermined time.

4. The control device of the synchronous rectifier according to claim 3, wherein the first clock generator comprises:
a detector configured to detect the voltage level of the power transmitted to the secondary side; and
a first clock signal generator configured to generate the first clock signal at the time when the switching off of the primary side is converted into the switching on of the primary side based on a detection result from the detector and to output the generated first clock signal to the off time determination unit.

5. The control device of the synchronous rectifier according to claim 3, wherein the second clock generator comprises:
a time delay unit configured to delay the high period of the first clock signal by the predetermined time; and
a second clock signal generator configured to generate the second clock signal based on a signal output from the time delay unit and to output the generated second clock signal to the off time determination unit.

6. The control device of the synchronous rectifier according to claim 3, wherein the off time determination unit comprises:
a voltage-current converter configured to convert a preset-reference voltage into a current;
a first ramp wave signal generator configured to generate a first ramp wave signal by charging and discharging the current from the voltage-current converter according to the first clock signal;
a second ramp wave signal generator configured to generate a second ramp wave signal by charging and discharging the current from the voltage-current converter according to the second clock signal;
a voltage-voltage converter configured to convert a voltage level of the second ramp wave signal from the second ramp wave signal generator;
a hold voltage generator configured to generate a hold voltage based on the second ramp wave signal of which the voltage level is converted by the voltage-voltage converter; and
a comparison unit configured to determine the switching off time by comparing the hold voltage from the hold voltage generator with a voltage level of the first ramp wave signal.

7. The control device of the synchronous rectifier according to claim 6, wherein the first ramp wave signal generator comprises:
a first current mirror configured to mirror a current from the voltage-current converter; and a first charging and discharging unit configured to generate the first ramp wave signal by charging and discharging the current mirrored by the first current mirror to/from a first capacitor according to the first clock signal.

8. The control device of the synchronous rectifier according to claim 7, wherein the second ramp wave signal generator unit comprises:
a second current mirror configured to mirror the current from the voltage-current converter; and
a second charging and discharging unit configured to generate the second ramp wave signal by charging and discharging the current mirrored by the second current mirror to/from a second capacitor according to the second clock signal.

9. The control device of the synchronous rectifier according to claim 8, wherein the second capacitor is completely discharged at the same period as the first capacitor.

10. A control device of a synchronous rectifier comprising:
a controller formed at a secondary side of a power supply, the power supply provided with a primary side and the secondary side electrically insulated from each other, the controller configured to control a rectified switching operation by detecting a switching conversion time of the primary side, the rectified switching operation being converted before the detected switching conversion time of the primary side by a predetermined time, and a conversion time of the rectified switching operation being determined based on a dual signal waveform,
wherein the controller of the synchronous rectifier comprises:
a clock generator configured to generate a clock signal according to the switching conversion time of the primary side and the predetermined time;
an off time determination unit configured to determine a switching off time of the rectified switching operation according to the clock signal from the clock generator; and
a driver configured to output a driving signal to drive the rectified switching operation according to the switching off time of the off time determination unit.

11. The control device of the synchronous rectifier according to claim 10, wherein the rectified switching operation converts from a switching on to a switching off at a time earlier than a time to convert from a switching off of the primary side to a switching on of the primary side by the predetermined time.

12. The control device of the synchronous rectifier according to claim 10, wherein the clock generator comprises:
a first clock generator configured to generate a first clock signal according to a time when a switching off of the primary side is converted into a switching on of the primary side by detecting a voltage level of the power transmitted to the secondary side; and
a second clock generator configured to generate a second clock signal by delaying a high period of the first clock signal by the predetermined time.

13. The control device of the synchronous rectifier according to claim 12, wherein the first clock generator comprises:
a detector configured to detect the voltage level of the power transmitted to the secondary side; and
a first clock signal generator configured to generate the first clock signal at the time when the switching off of the primary side is converted into the switching on of the primary side based on a detection result from the detector and to output the generated first clock signal to the off time determination unit.

14. The control device of the synchronous rectifier according to claim 12, wherein the second clock generator comprises:
   a time delay unit configured to delay the high period of the first clock signal by the predetermined time; and
   a second clock signal generator configured to generate the second clock signal based on a signal outputted from the time delay unit and to output the generated second clock signal to the off time determination unit.

15. The control device of the synchronous rectifier according to claim 12, wherein the off time determination unit comprises:
   a voltage-current converter configured to convert a reference voltage into a current;
   a first ramp wave signal generator configured to generate a first ramp wave signal by charging and discharging the current from the voltage-current converter according to the first clock signal;
   a second ramp wave signal generator configured to generate a second ramp wave signal by charging and discharging the current from the voltage-current converter according to the second clock signal;
   a voltage-voltage converter configured to convert a voltage level of the second ramp wave signal from the second ramp wave signal generator;
   a hold voltage generator configured to generate a hold voltage based on the second ramp wave signal of which the voltage level is converted by the voltage-voltage converter; and
   a comparison unit configured to determine the switching off time by comparing the hold voltage from the hold voltage generator with a voltage level of the first ramp wave signal.

16. The control device of the synchronous rectifier according to claim 15, wherein the first ramp wave signal generator comprises:
   a first current mirror configured to mirror the current from the voltage-current converter; and
   a first charging and discharging unit configured to generate the first ramp wave signal by charging and discharging the current mirrored by the first current mirror to/from a first capacitor according to the first clock signal.

17. The control device of the synchronous rectifier according to claim 16, wherein the second ramp wave signal generator comprises:
   a second current mirror configured to mirror the current from the voltage-current converter; and
   a second charging and discharging unit configured to generate the second ramp wave signal by charging and discharging the current mirrored by the second current mirror to/from a second capacitor according to the second clock signal.

18. The control device of the synchronous rectifier according to claim 17, wherein the second capacitor is completely discharged at the same period as the first capacitor.

19. A power supply provided with a primary side and a secondary side electrically insulated from each other, comprising:
   the power supply configured to switch a power input to the primary side to transmit to the secondary side; and
   a synchronous rectifier formed at the secondary side and configured to perform a rectification switching operation based on the switching of the power supply according to a power transmitted to the secondary side and convert the rectification switching operation at a time earlier than a switching conversion time of the power supply by a predetermined time,
   wherein the synchronous rectifier comprises:
      a clock generator configured to generate a clock signal according to the switching conversion time of the power supply and the predetermined time;
      an off time determining unit configured to determine a switching off time of the rectification switching operation according to the clock signal from the clock generator; and
      a driving unit configured to output a driving signal to drive the rectification switching operation according to the switching off time of the off time determination unit.

20. The power supply according to claim 19, wherein the synchronous rectifier converts the rectification switching operation from a switching on to a switching off at a time earlier than a time to convert from a switching off of the power supply to a switching on of the power supply by the predetermined time.

21. The power supply according to claim 19, wherein the clock generator comprises:
   a first clock generator configured to generate a first clock signal according to a time when a switching off of the power supply is converted into a switching on of the power supply by detecting a voltage level of the power transmitted to the secondary side; and
   a second clock generator configured to generate a second clock signal by delaying a high period of the first clock signal by the predetermined time.

22. The power supply according to claim 21, wherein the first clock generator comprises:
   a detector configured to detect the voltage level of the power transmitted to the secondary side; and
   a first clock signal generator configured to generate the first clock signal at the time when the switching off of the power supply is converted into the switching on of the power supply based on a detection result from the detector and to output the generated first clock signal to the off time determination unit.

23. The power supply according to claim 21, wherein the second clock generator comprises:
   a time delay unit configured to delay the high period of the first clock signal by the predetermined time; and
   a second clock signal generator configured to generate the second clock signal based on a signal outputted from the time delay unit and to output the generated second clock signal to the off time determination unit.

24. The power supply according to claim 21, wherein the off time determination unit comprises:
   a voltage-current converter configured to convert a preset-reference voltage into a current;
   a first ramp wave signal generator configured to generate a first ramp wave signal by charging and discharging the current from the voltage-current converter according to the first clock signal;
   a second ramp wave signal generator configured to generate a second ramp wave signal by charging and discharging the current from the voltage-current converter according to the second clock signal;

a voltage-voltage converter configured to convert a voltage level of the second ramp wave signal from the second ramp wave signal generator;

a hold voltage generator configured to generate a hold voltage based on the second ramp wave signal of which the voltage level is converted by the voltage-voltage converter; and a comparison unit configured to determine the switching off time by comparing the hold voltage from the hold voltage generator with a voltage level of the first ramp wave signal.

25. The power supply according to claim 24, wherein the first ramp wave signal generator comprises:

a first current mirror configured to mirror the current from the voltage-current converter; and a first charging and discharging unit configured to generate the first ramp wave signal by charging and discharging the current mirrored by the first current mirror to/from a first capacitor according to the first clock signal.

26. The power supply according to claim 25, wherein the second ramp wave signal generator comprises:

a second current mirror configured to mirror the current from the voltage-current converter; and a second charging and discharging unit configured to generate the second ramp wave signal by charging and discharging the current mirrored by the second current mirror to/from a second capacitor according to the second clock signal.

27. The power supply according to claim 26, wherein the second capacitor is completely discharged at the same period as the first capacitor.

28. A power supply provided with a primary side and a secondary side electrically insulated from each other, comprising:

the power supply configured to switch a power input to the primary side to transmit to the secondary side; and a synchronous rectifier formed at the secondary side and configured to perform a rectification switching operation by detecting a switching conversion time of the power supply, to convert the rectification switching operation at a time earlier than a detected switching conversion time of the power supply by a predetermined time and determine a conversion time of the rectification switching operation based on a dual signal waveform, wherein the synchronous rectifier comprises:

a clock generator configured to generate a clock signal according to the switching conversion time of the power supply and the predetermined time;

an off time determining unit configured to determine a switching off time of the rectification switching operation according to the clock signal from the clock generator; and a driver configured to output a driving signal to drive the rectification switching operation according to the switching off time of the off time determination unit.

29. The power supply according to claim 28, wherein the synchronous rectifier converts the rectification switching operation from a switching on to a switching off at a time earlier than a time to convert from a switching off of the power supply to a switching on of the power supply by the predetermined time.

30. The power supply according to claim 28, wherein the clock generation unit comprises:

a first clock generator configured to generate a first clock signal according to a time when a switching off of the power supply is converted into a switching on of the Dower supply by detecting a voltage level of the power transmitted to the secondary side; and a second clock generator configured to generate a second clock signal by delaying a high period of the first clock signal by the predetermined time.

31. The power supply according to claim 30, wherein the first clock generator comprises:

a detector configured to detect the voltage level of the power transmitted to the secondary side; and a first clock signal generator configured to generate the first clock signal at the time when the switching off of the power supply is converted into the switching on of the power supply based on a detection result from the detector and to output the generated first clock signal to the off time determination unit.

32. The power supply according to claim 30, wherein the second clock generator comprises:

a time delay unit configured to delay the high period of the first clock signal by the predetermined time; and a second clock signal generator configured to generate the second clock signal based on a signal output from the time delay unit and to output the generated second clock signal to the off time determination unit.

33. The power supply according to claim 30, wherein the off time determination unit comprises:

a voltage-current converter for converting a preset-reference voltage into a current;

a first ramp wave signal generator configured to generate a first ramp wave signal by charging and discharging the current from the voltage-current converter according to the first clock signal;

a second ramp wave signal generator configured to generate a second ramp wave signal by charging and discharging the current from the voltage-current converter according to the second clock signal;

a voltage-voltage converter configured to convert a voltage level of the second ramp wave signal from the second ramp wave signal generator;

a hold voltage generator configured to generate a hold voltage based on the second ramp wave signal of which the voltage level is converted by the voltage-voltage converter; and a comparison unit configured to determine the switching off time by comparing the hold voltage from the hold voltage generator with a voltage level of the first ramp wave signal.

34. The power supply according to claim 33, wherein the first ramp wave signal generator comprises:

a first current mirror configured to mirror the current from the voltage-current converter; and a first charging and discharging unit configured to generate the first ramp wave signal by charging and discharging the current mirrored by the first current mirror to/from a first capacitor according to the first clock signal.

35. The power supply according to claim 34, wherein the second ramp wave signal generation unit comprises:

a second current mirror configured to mirror the current from the voltage-current converter; and a second charging and discharging unit configured to generate the second ramp wave signal by charging and discharging the current mirrored by the second current mirror to/from a second capacitor according to the second clock signal.

36. The power supply according to claim 35, wherein the second capacitor is completely discharged at the same period as the first capacitor.

* * * * *